United States Patent [19]

Numata et al.

[11] 4,342,505

[45] Aug. 3, 1982

[54] AUTOMATIC EXPOSURE CONTROL DEVICE FOR A SINGLE LENS REFLEX CAMERA

[75] Inventors: Saburo Numata; Shinichiro Fujino, both of Urawa, Japan

[73] Assignee: Fuji Photo Optical Co., Ltd., Omiya, Japan

[21] Appl. No.: 61,855

[22] Filed: Jul. 30, 1979

Related U.S. Application Data

[63] Continuation-in-part of Ser. No. 850,454, Nov. 10, 1977, abandoned, which is a continuation-in-part of Ser. No. 675,249, Apr. 9, 1976, abandoned.

[30] Foreign Application Priority Data

Apr. 9, 1975 [JP] Japan .................................. 50-42968

[51] Int. Cl.$^3$ ...................... G03B 7/093; G03B 17/38
[52] U.S. Cl. .................................. 354/23 D; 354/50; 354/266; 354/60 A
[58] Field of Search .............. 354/23 D, 50, 51, 60 A, 354/234, 235, 238, 266–268

[56] References Cited

U.S. PATENT DOCUMENTS

| | | | |
|---|---|---|---|
| 3,928,858 | 12/1975 | Sakurada et al. | 354/23 D |
| 4,047,189 | 9/1977 | Bletz | 354/60 A |
| 4,079,386 | 3/1978 | Murakami et al. | 354/23 D |
| 4,193,673 | 3/1980 | Ishiguro | 354/23 D |

FOREIGN PATENT DOCUMENTS

| | | | |
|---|---|---|---|
| 2360377 | 6/1974 | Fed. Rep. of Germany | 354/23 D |
| 2410959 | 9/1974 | Fed. Rep. of Germany | 354/23 D |

*Primary Examiner*—L. T. Hix
*Assistant Examiner*—William B. Perkey

[57] ABSTRACT

In an automatic exposure control device of digital information type for a single lens reflex camera, a sampling circuit for dividing pulses generated from an oscillator and a shutter release signal generating circuit are connected with a gate means having a function of an AND circuit. The gate means connected with a leading shutter blind control device and a normally turned OFF gate interposed between the oscillator and a clock pulse counter. When the gate means is turned ON by the simultaneous output of the sampling circuit and the shutter release signal generating circuit, the normally turned OFF gate is turned ON to initiate the counting of the clock pulses and the leading shutter blind is started to initiate exposure.

3 Claims, 7 Drawing Figures

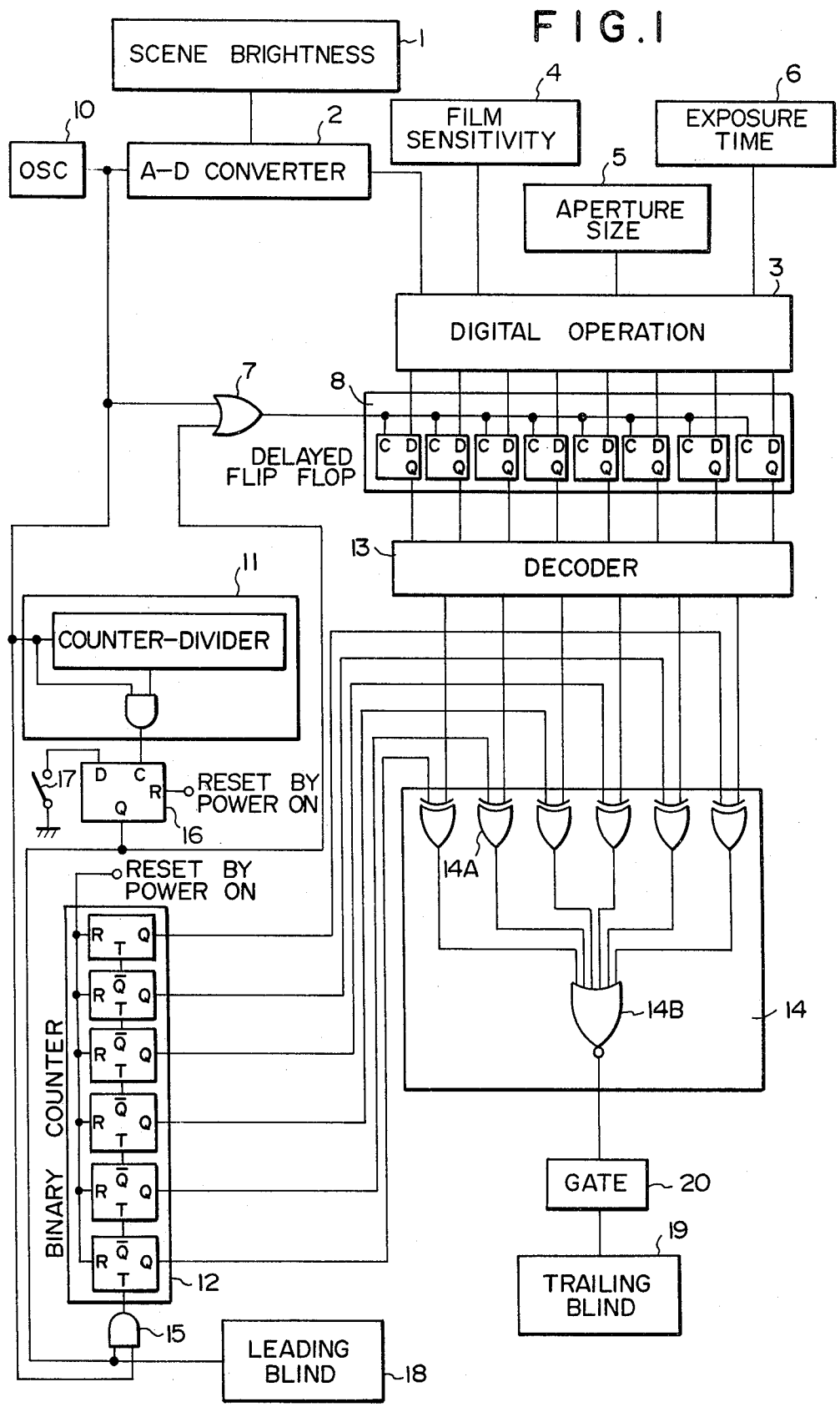

FIG.2A POWER SUPPLY 
FIG.2B SHUTTER RELEASE 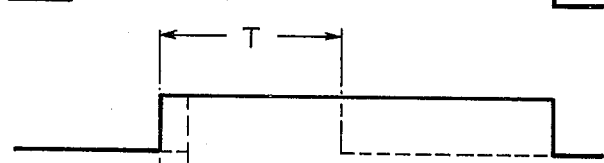
FIG.2C CLOCK PULSE 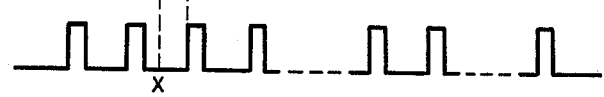
FIG.2D DUTY PULSE 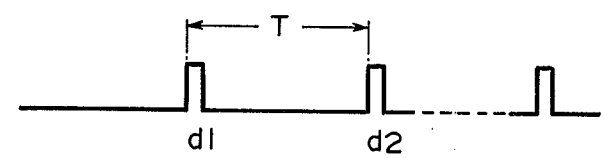
FIG.2E LEADING BLIND 
FIG.2F TRAILING BLIND 

AUTOMATIC EXPOSURE CONTROL DEVICE FOR A SINGLE LENS REFLEX CAMERA

This application is a continuation-in-part of U.S. patent application Ser. No. 850,454 filed Nov. 10, 1977, now abandoned, which is a continuation-in-part of U.S. patent application Ser. No. 675,249 filed Apr. 9, 1976 now abandoned.

BACKGROUND OF THE INVENTION

1. Field of the Invention

This invention relates to an automatic exposure control device for a single lens reflex camera, and more particularly to an automatic exposure control device in which exposure factors are treated in the form of digital signals by use of pulses.

2. Description of the Prior Art

In the conventional automatic exposure control device for a single lens reflex camera, the scene brightness is measured before the shutter is released and the measured scene brightness is memorized in a memory in the camera so as to be used for controlling exposure when the shutter is released. The exposure control is conducted by controlling the exposure time or the aperture size of a diaphragm. It has been known in the art to memorize the measured scene brightness in the form of digital value. The digital type control system has been proved advantageous in various points than the analogue type control system in the field of exposure control. In the digital type exposure control system, the number of pulses of clock pulses generated from a pulse generator is counted. The digital type exposure control system has a defect in that it is very difficult to accurately start the counting of the clock pulses simultaneously with the start of a leading blind of a shutter. From the viewpoint of accurate exposure control, it is of course desired that the counting of the clock pulses be started simultaneously with the start of running of the leading blind of the shutter.

SUMMARY OF THE INVENTION

In view of the above described defect inherent in the conventional digital type exposure control system for a single lens reflex camera, the primary object of the present invention is to provide an automatic exposure control device for a single lens reflex camera in which the start of the counting of clock pulses is made accurately simultaneously with the start of the running of the leading blind of a shutter mechanism, thereby obtaining an accurate exposure time controlled with respect to the scene brightness.

The exposure control device in accordance with the present invention employs a sampling circuit and a shutter release means connected with a gate which is connected with another gate for starting the counting of clock pulses and with a leading blind for starting the leading blind. The latter gate operates to start the counting of clock pulses and to start the running of the leading blind of the shutter simultaneously upon receipt of a signal from the former gate which generates a single when it receives a sampling pulse signal and a shutter release signal at a time.

BRIEF DESCRIPTION OF THE DRAWING

FIG. 1 is a blockdiagram showing an embodiment of the electric circuit for an automatic exposure control device in accordance with the present invention, and FIGS. 2A to 2F show sequential operations of various parts of the electric circuit as shown in FIG. 1.

DESCRIPTION OF THE PREFERRED EMBODIMENT

Referring to FIG. 1, a light measuring circuit 1 which measures the scene brightness is connected with an A–D converter 2 which is connected with a digital operating circuit 3. The digital operating circuit 3 is connected with a film sensitivity setting means 4, an aperture size setting means 5 and an exposure time setting means 6 for digitalling treating the various exposure factors. In this embodiment, the exposure time setting means 6 is set in its AUTO side so that the exposure time may be automatically controlled. The scene brightness, the film sensitivity and the aperture size of a diaphragm which is manually selected are put into the digital operating circuit 3 and operated therethrough and put into a memory means 8 by way of an OR-gate 7 to be memorized therein. The signal or information from the three input means 2, 4 and 5 is operated in the form of digital signal in the operating circuit 3 and memorized by the memory means 8 in the digital form. In this embodiment, the information memorized in the memory means 8 corresponds to a desirable exposure time which is determined by the scene brightness measured by the light measuring circuit 1. An oscillator 10 generates pulses of constant frequency continuously. The pulses from the oscillator 10 are supplied to a sampling circuit 11 like a divider and to a clock pulse counter 12 by way of a gate 15. The clock pulse counter 12 is for instance a pulse counter constituted by a flip-flop circuit which converts the pulses from the oscillator 10 to binary signals. Said sampling circuit 11 has a function to divide the pulses from the oscillator 10, for instance generates one pulse per ten pulses from the oscillator 10. The digital information memorized in the memory means 8 is transmitted to a logic circuit 14 by way of a decoder 13 which converts the digital information into a binary signal like said clock pulse counter 12. The pulse information made into a binary form through the counter 12 is also transmitted to the logic circuit 14. The logic circuit 14 receives the pulse information from the clock pulse counter 12 and the information regarding the scene brightness from the decoder 13 and compares the two kinds of information and detects the coincidence between the two, and accordingly can be made of an exclusive-OR circuit or a NOR-gate. The gate 7 interposed between the digital operating circuit 3 and the memory means 8 functions as a normally turned-on switch and is turned OFF upon receipt of a signal, and said gate 15 interposed between the oscillator 10 and the clock pulse counter 12 is turned ON upon receipt of a signal. These gates 7 and 15 are connected with a D type flip-flop 16 serving as a gate means having a function of an AND circuit to receive a signal for turning on or off therefrom. The gate means 16 is connected with said sampling circuit 11 and a shutter release means 17 so that the gate means 16 will be turned ON when it receives a signal from both circuits 11 and 17. The gate 16 is connected to a leading blind control means 18 which operates to start a leading shutter blind when it receives a signal from the gate means 16. Said logic circuit 14 is connected to a trailing blind control means 19 by way of a gate 20. The trailing blind control means 19 starts a trailing shutter blind upon receipt of a signal from the gate 20. The gates 16 and 20 are supplied with a signal for operating the shutter blind control means 18 and 19 and transmits the signal therethrough to the control means 18 and 19.

In the above circuitry, for instance, the operating circuit 3 could be an adding and subtracting circuit when exposure information from 2, 4, 5 and 6 is log-compressed, or a multiplying and dividing circuit when the exposure information is not log-compressed. The memory means 8 is a delayed-flip flop (which memorizes input at terminal D at terminal Q when the latch pulse is at ligh or low level) when output of 3 is parallel. However, if the output is serial, 8 is binary counter or shift register. The sampling circuit 11 could be a divider or N-bit counter. The counter 12 is for instance a binary counter. The decoder 13 converts output of 8 to the code of 12, that is a binary code and the logic circuit 14 is a digital coincidence detecting circuit.

Now the operation of the above described embodiment of the automatic exposure control device in accordance with the present invention will be described in detail with reference to FIGS. 1 and 2.

In order to automatically control the shutter speed, the exposure time setting means 6 is set in its AUTO side. A power supply switch (not shown) is turned ON then. Upon the turning ON of the power supply switch, the oscillator 10 starts to generate pulses at a constant frequency and the light measuring circuit 1 starts to measure the scene brightness and transmits the measured scene brightness signal to the A–D converter 2. The A–D converter 2 converts the output of the light measuring circuit 1 to a digital value by use of the pulses sent from the oscillator 10 and transmits the digital value to the digital operating circuit 3. The digital operating circuit 3 operates the digital value sent from the A–D converter 2 representing the scene brightness together with digital information given from said film sensitivity setting means 4 and the aperture size setting means 5 representing the film sensitivity and the aperture size of the diaphragm, respectively, in the form of digital value. The operated value which represents the desirable exposure time is transmitted to the memory means 8 when the OR gate 7 is in the state to function as a normally open gate between the digital operating circuit 3 and the memory means 8, and memorized therein. The memorized value is transmitted to the logic circuit 14 by way of the decoder 13 in the binary form. On the other hand, pulses from the oscillator 10 are divided by the sampling circuit 11 and transmitted to the AND gate 16 in the form of duty pulse having a comparatively long period T. However, since the gate 15 is now closed, i.e. turned OFF, the clock pulses from the oscillator 10 is not transmitted to the clock pulse counter 12. The waveform of the duty pulse given to the gate means 16 from the sampling circuit 11 is shown in FIG. 2D, and the waveform of the clockpulses generated by the oscillator 10 is shown in FIG. 2C.

When a shutter release button or the like is depressed to release a shutter, the shutter release means 17 generates a signal which has a substantially long period of high level as shown in FIG. 2B. Upon generation of the shutter release signal given by the shutter release means 17, the AND gate 16 starts to transmit the signal from the sampling circuit 11 and the shutter release means 17 to said gates 7 and 15 and to said leading blind control means 18. Thus, the gate 7 is turned OFF and the gate 15 is turned ON, and accordingly, a digital value representing the scene brightness immediately before the gate 7 is turned OFF is memorized in the memory means 8. Simultaneously, the clock pulse counter 12 starts to count the clock pulses and the leading shutter blind is started to initiate the exposure.

When the number of pulses counted by the pulse counter 12 reaches the memorized value input into the logic circuit 14 from the decoder 13, the logic circuit 14 operates to turn ON the gate 20 and drive the trailing blind control means 19 to start the trailing shutter blind to terminate the exposure.

The above described operation of the automatic exposure control device of this invention will now be described in more detail with reference to FIGS. 2A to 2F.

When the power supply switch (not shown) is turned ON, the light measuring circuit is supplied with the power as shown in FIG. 2A, and the oscillator 10 starts to generate clock pulses of constant frequency as shown in FIG. 2C. When the shutter release means 17 is operated, a signal having a substantial length of high level as shown in FIG. 2B is given to the gate means 16 to turn ON the gate 15. Therefore, the clock pulses are counted after the shutter release means 17 has generated the signal as shown in FIG. 2B. Thus, the clock pulses are counted from the pulse C1 shown in FIG. 2C. Simultaneously with the start of the counting of the pulses C1, C2, ..., the leading blind is started as shown in FIG. 2E. When the number of pulses corresponding to the memorized value (corresponding to the pulses C1 to Cn) has been counted, the trailing shutter blind is started as shown in FIG. 2F to terminate the exposure. When the trailing shutter blind has finished running, the power supply is ended as shown in FIG. 2A and all the operations are completed to finish one cycle of operation. It should be noted that the sampling cycle T of the sampling pulses as shown in FIG. 2D, i.e. period between adjacent pulses d1 and d2, must be set to be shorter than the lower limit of shutter speed that causes image blur owing to vibration of hands, e.g. 1/30 second. Further, the time of duration of the shutter release signal as shown in FIG. 2B must not be shorter than the sampling cycle T.

In accordance with the automatic exposure control device of this invention as described hereinabove, when the shutter is released at a point between clock pulses as indicated by the character x in FIG. 2C, the time from the point x to the first pulse C1 therefrom which effects as a delay in the conventional exposure control device does not effect at all since the leading shutter blind is not started until the sampling pulse d1 (FIG. 2D) is detected. In other words, regardless of the difference between the start of the shutter release operation (FIG. 2B) and the start of the counting of clock pulses (FIG. 2C), the start of the counting pulses and the start of the leading shutter blind are made simultaneously.

We claim:

1. An automatic exposure control device for a single lens reflex camera wherein various exposure factors are treated in the form of digital value and the measured scene brightness is compared with the number of clock pulses counted in the camera for controlling the exposure time wherein the improvement comprising:

an oscillator for generating clock pulses of constant frequency, a normally turned off gate connected with said oscillator, a clock pulse counter connected with the gate for counting the clock pulses when the gate is turned on, said clock pulse counter being connected with a trailing blind control means which is connected with a memory means wherein the scene brightness is memorized, a sampling circuit connected with said oscillator for dividing the pulses generated therefrom to provide sampling pulses, a shutter release means for generating a signal having a high level of the period longer than the period of said sampling pulses, a gate means having a function of an AND circuit connected with said sampling circuit and said shutter release means for giving an output of high level when said gate means receives said sampling pulses together with said shutter release signal, and a leading blind control means for starting a leading shutter blind upon receipt of a signal, said normally turned off gate being connected with said gate means so as to be turned on upon receipt of a signal of high level therefrom, and said leading blind control means being connected with said gate means, whereby said normally turned off gate is turned on simultaneously with the start of the leading blind.

2. An automatic exposure control device as defined in claim 1 wherein said gate means is further connected with a normally turned on gate interposed between a memory means which memorizes said scene brightness and a digital operating means which is connected with various exposure factor input means including a light measuring means, whereby the memorization of the scene brightness is stopped when said gate means starts to provide an output of high level.

3. An automatic exposure control device as defined in claim 1 wherein the period of the sampling pulses is shorter than the lower limit of exposure time which causes image blur owing to vibration of hands.

* * * * *